Patented Feb. 14, 1939

2,146,867

UNITED STATES PATENT OFFICE

2,146,867

MEDICINAL PREPARATION AND METHOD OF MAKING THE SAME

Boyd P. Welin, Pasadena, Calif., assignor to Welin-Sater Company, Pasadena, Calif., a corporation of California No Drawing. Application June 7, 1937, Serial No. 146,854

4 Claims. (Cl. 167—82)

This invention relates to a medicinal preparation for internal use, such preparation consisting essentially of vegetable gums, particularly gums of the Sterculia group, the composition being particularly adapted for general treatment and remedial action of the intestinal tract.

In the past, attempts have been made to utilize vegetable gums for a similar purpose and reference is particularly made to agar agar and its many uses in medicinal compounds. It has been found that these prior preparations, however, have numerous limitations which detract from their value and limit their usefulness.

The present invention is particularly directed toward a substantially dry granular product capable of absorbing moisture from the intestinal tract and composed essentially of vegetable gums of the Sterculia group, gums from this group having a highly desirable motility and stimulative action as well as stability, a desired rate of hydration, and other properties which make these gums eminently suited for the purposes to which the product of this invention is directed. Furthermore, the present invention relates to a medicinal compound consisting essentially of the gums from the selected group, the compound being made in such manner that hydration of the gums is retarded so that very little hydration takes place in the stomach, the desired hydration taking place within the intestinal tract wherein it can be regulated to some extent by the method of preparation used in making the product, the ingredients or medicinal components embodied in the product and the manner in which the compound is administered and handled within the body.

The invention is in part at least based upon the discovery that instead of using large quantities of materials of no therapeutic value for coatings (thereby reducing the effective bulk of the material and introducing large proportions of undesirable constituents), the hydration of the body portion of a granule of gum may be effectively retarded by providing such granule with a coating containing the gum in finely divided form. When the exterior coating of such finely divided particles of gum comes in contact with moisture, the finely divided particles hydrate quickly and form a rather impervious hydrated coating around the central lump or crystal of gum constituting the body of the granule, thereby retarding the hydration of such body portion until the exterior hydrated layer is subjected to the action of the fluids and movements of the intestinal tract.

The invention also contemplates means and methods whereby the granular product of this invention is maintained in stable condition and may be caused to act as a vehicle for various medicinal ingredients, compounds or mixtures for the proper and desired distribution of such medicinal compounds throughout the intestinal tract.

Generally stated, therefore, this invention relates to means and methods whereby an improved medicinal compound in granular bulk form may be made from moisture-absorbing gums of the Sterculia group.

An object of the inventions is to disclose and provide an improved medicinal compound in granular form, each granule consisting of a body portion composed essentially of angular, uncompressed, substantially homogeneous vegetable gum covered with a coating containing said gum in finely divided form whereby hydration of the body portion is retarded.

Another object of the invention is to disclose and provide means and methods whereby the formation of desired coatings on a granular vegetable gum product may be formed.

These and other objects, uses and advantages of the invention will become apparent to those skilled in the art from the following detailed description of a preferred method of operation, it being understood that numerous changes and modifications may be made without departing from the general teachings of this invention.

As stated hereinbefore, the product of this invention consists essentially of vegetable gums belonging to the Sterculia group, among which, gums such as karaya gum, so-called bassoritwood gum and gum Sterculia are best known. For internal use the lighter colored and better varieties are preferred. These gums are preferably obtained in large irregular lumps and should be substantially dry, i. e., having a moisture content not exceeding about 2.5%. Gums of this family have a highly desirable motility but vary appreciably in capacity to absorb moisture, some gums absorbing 60 times their own weight of water whereas others will absorb as high as 100 times their own weight. What is known as crystal karaya gum has been found to be eminently suited for use in the product of this invention and it will have an average moisture-absorbing capacity of from about 80 to 88 times its own weight. This gum is not neutral to litmus but instead slightly acid.

The gum in lump form is first coarsely crushed and cleaned by air separation for the purpose of removing lighter particles. Thereafter it is further crushed for the purpose of reducing it to a desired granular condition. This crushed material is separated by screening, air separation or other suitable means so as to produce a granular product substantially free from finely divided or powdered gum. This granular product composed of uncompressed, substantially homogeneous angular particles preferably consists of particles which will pass a 6 or 8 mesh sieve and be retained on about a 20 mesh sieve. The more finely subdivided material may then be further milled or crushed so as to produce a substantially powdered product for use as hereinafter described.

The substantially dry, granular material is capable of absorbing water readily and should be for this reason maintained in a substantially dry atmosphere. Ordinary atmospheric conditions are satisfactory unless extremely high humidity conditions are encountered. In order to prevent the absorption of undesired moisture, a weighed batch of the granular material is placed in a revolving coating pan, the axis of rotation being at an angle of about 50°–60° to the vertical. In a specific embodiment, the coating pans rotate at a speed of from about 25 to 75 R. P. M. and are made of metal so that the batch of granular gum upon being discharged into the pan will climb up the sides and fall into the bottom from a point near the top of the pan. A small quantity of a water-repellent substance is added to the batch of gum while it is being mixed by the rotating pan. Highly refined neutral mineral oil is an effective water-repellent material and when added in quantities of from about 0.5 ounce to 2 ounces per 10 pounds of granular gum, such oil will form a minute but effective oily film over the surfaces of the particles, thereby effectively preventing absorption of moisture by the granular material during the subsequent manufacturing operations.

Thereafter, various coatings are applied to the granular material. Such coatings may include medicinal compounds or ingredients such as belladonna, calcium phosphate, calcium lactate, cascara, magnesium oxide, barbital, aluminum hydroxide, bismuth, anti-spasmodics, or the like. Additional coatings may be formed on the granules for the purpose of retarding hydration of the body portion so that the coating is effectively enteric and will render the body portion of the granule effective only after it passes the duodenum. Since the original crushed granules are rather angular and sharp, coatings adapted to impart a more rounded contour to the particles may also be applied, thereby permitting the granular material to be taken orally without discomfort.

In the formation of these coatings it is highly desirable to first spray the granular material (treated as above described with an oleaginous or water-repellent substance) with a solution of gelatin or the like in order to moisten the granular material. These gelatin solutions may contain sugar in addition to the gelatin and a gum in lieu of or in addition to the gelatin. For example, from 0.5 to 2.5 pounds of gelatin per gallon of water may be used and to this may be added up to 8 or even 14 pounds of sugar and up to about 0.7 pounds of a vegetable gum such as gum acacia.

A small quantity of this gelatin solution is added to the granular gum in the coating pan, the amount of solution so added depending somewhat upon the fineness of the granular material. Ordinarily, the quantity of gelatin solution added is only sufficient to render the granular material moist and sticky, the previously applied oily film preventing the gum from hydrating. Rotation of the pan and the agitation of the granules assures uniform moistening. The moistened granules are then dusted with a suitable powder which may or may not contain medicinal constituents of the character referred to herein. These dusting powders may consist of starch, sugars, talc, calcium carbonate and powdered vegetable gum or suitable mixtures of these ingredients. Agitation of the granular material in the rolling pan is continued during the dusting operation, the dusting powder being applied in any suitable manner as, for example, by means of a shaker can or sifter, scoop or the like. Additional hand agitation may be resorted to while the material is being rolled in the pan in order to prevent case-hardening. The powder will adhere to the moist particles of gum and as it begins to dry, a blast of air may be directed onto the granular material in the pan in order to facilitate and expedite drying and dehydration.

One or more of such coatings may be applied to the granular material, each application of gelatin solution being followed with an application of a suitable dusting powder. Preferably the dusting powder containing the medicinal components is the first dusting powder used, subsequent dusting powders being free therefrom. The moistening, dusting and drying steps are repeated until a suitable thickness of coating has been formed on each particle of gum.

Even though the steps described hereinabove are repeated three or four times, it will be found that the coarser particles are still angular and rough. In order to impart a more desirable rounded contour to the particles, a rounding coat may be formed by first moistening the particles with a very viscous starch solution or a solution containing starch, sugar and an inorganic material such as talc, tremolite, or the like. This rounding coat is also applied in the rotating pan in the same manner as has been previously described for the application of gelatin sub-coatings. In order to finish the product, the final dusting coat may consist essentially of sugars, starch, and mixtures thereof or of other ingredients capable of facilitating swallowing of the preparation.

When it is desired that the granules be provided with an enteric-like coating, the dusting powders are caused to contain high proportions of finely divided or powdered karaya gum. The finished product may consist of 60% of karaya gum crystals or granules, 15% of powdered karaya gum, 15% of powdered sugar and 10% of moisture, starch, medicinal constituents and inert ingredients. It is to be noted that the coatings may contain from 10% to 65% or 70% of powdered gum, thereby permitting the use of relatively large quantities of the powdered material and increasing the bulk value of the resulting product while at the same time retarding hydration of the body portion of each granule.

Generally stated, the solutions used in moistening the gum crystals or granules may have the following composition:

| | Per cent by weight |
|---|---|
| Gelatin | 2 to 8 |
| Other gums | 0 to 6 |
| Total gums | 2 to 14 |
| Sugar | 40 to 60 |
| Water | 40 to 60 |

As pointed out hereinabove, in certain instances it is desirable not to use sugars and then in that case the proportion of gums or gelatin may be increased or a substance such as starch substituted, in part at least, for the sugar. Instead of sucrose other sugars such as dextrose, lactose and the like may be used.

The dusting powders used in making the casings may vary greatly in composition. The ingredients used in these dusting powders may include sugar, starch, precipitated chalk, talc, powdered gums such as acacia, karaya, tragacanth, etc., and other substances. Sugar, starch and gums are generally the three ingredients used most extensively. A dusting powder may, for example, be composed of 90% starch and 10% talcum. Another may be composed of 75% sugar and 25% starch. The enteric-like coatings or dusting powders may comprise 50% sugar and 50% karaya gum in powdered form, or one specific coating adapted for this purpose contained 30% sugar, 30% powdered karaya, 30% starch and 10% powdered gum acacia.

The rounding coatings adapted to impart rounded contours to the crystals generally contain more than 60% of total soluble and insoluble solids and preferably 65% or more of the coating material comprises total solids. One typical coating of this character comprised 64% sugar, 3% starch, 1% talc and 32% water.

Gums of the Sterculia group hydrate very readily and in the event the surface coating contains a material proportion of such gum, the particle or granule may become sticky while in the mouth and thereby make swallowing thereof difficult. Surface coatings of other materials, such as starch, sugars and flavors, are preferred for this reason. The intermediate coating layers may have large proportions of powdered gum and apparently these powdered gum particles hydrate readily in the stomach to form a hydrated envelope around the body portion of the granule, such hydrated envelope resisting the passage of moisture to the body portion, thereby retarding or inhibiting the hydration of such body portion for an appreciable period of time.

Although specific formulas have been mentioned herein, those skilled in the art will readily apprehend that numerous changes and modifications may be made therein. The various flavors, medicinal ingredients, solvents and colloids may be used in different combinations in compounding the various coatings. All changes and modifications coming within the scope of the appended claims are embraced thereby.

I claim:

1. A medicinal compound in granular form and composed essentially of a vegetable gum of the Sterculia group, each granule of said compound comprising a body portion of said gum in substantially homogeneous, uncompacted, angular form, a film of oleaginous water-repellent material on the granules, and an exterior, slowly soluble coating containing particles of said gum in finely divided form on the surface of each granule, said medicinal compound being characterized by its ability to retain its granular form and substantially constant weight in storage, said coating being adapted to retard hydration of the body of the granules.

2. A medicinal compound consisting essentially of particles remaining on about a 20 mesh sieve but passing a 6 mesh sieve, 60% or more of said compound consisting of a vegetable gum of the Sterculia group, each granule of said composition being provided with a film of oleaginous water-repellent material, and a superimposed coating containing medicinal constituents, the coating also containing gum of the Sterculia group in finely divided form.

3. In a method of manufacturing a medicinal compound in granular form, the steps of forming a film of oleaginous water-repellent material on the surfaces of granular particles of a vegetable gum of the Sterculia group, then moistening said granular particles with an aqueous solution containing gelatinous material, dusting the moistened granules with a powder containing sugar, medicinal ingredients and powdered gum, drying the dusted granular product, and repeating the moistening, dusting and drying steps to form a coating.

4. A method of manufacturing a medicinal compound in granular form comprising: forming a film of oily water-repellent material on the surfaces of granular particles of karaya gum, said granular karaya gum being virtually free from particles passing a 20 mesh sieve, moistening said granular material with an aqueous solution containing from about 2% to 14% by weight of a gum or gelatin and 40% to 60% by weight of sugars; dusting the granules with a composition containing medicinal constituents and powdered gum karaya; and repeating the moistening, dusting and drying steps to form coatings on said granular particles.

BOYD P. WELIN.